April 29, 1958
A. SOSS
2,832,410
POWER ACTUATED MEAT CLEAVER
Filed Aug. 16, 1955
2 Sheets-Sheet 1
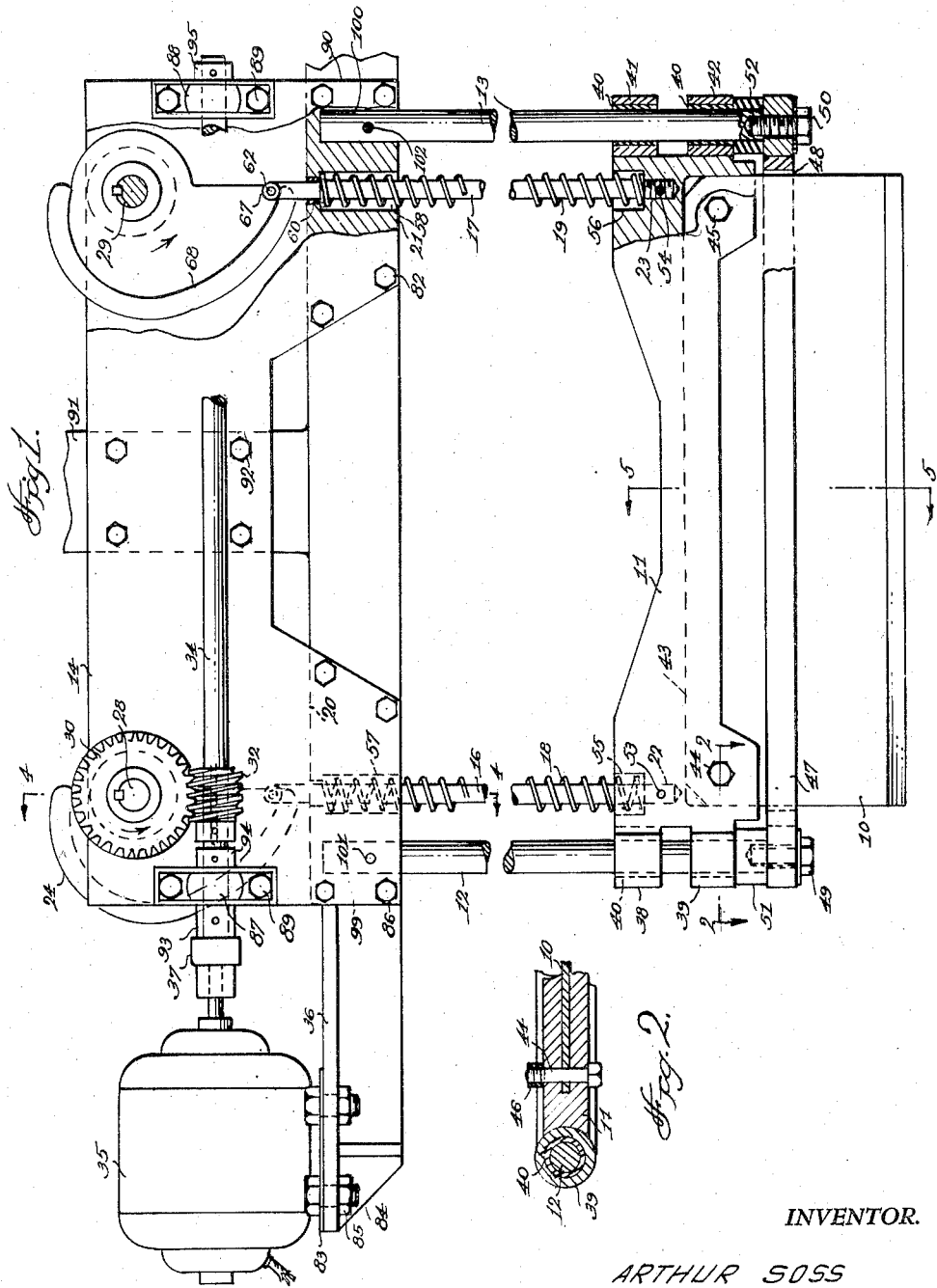
INVENTOR.
ARTHUR SOSS
BY *Victor J. Evans & Co.*
ATTORNEYS

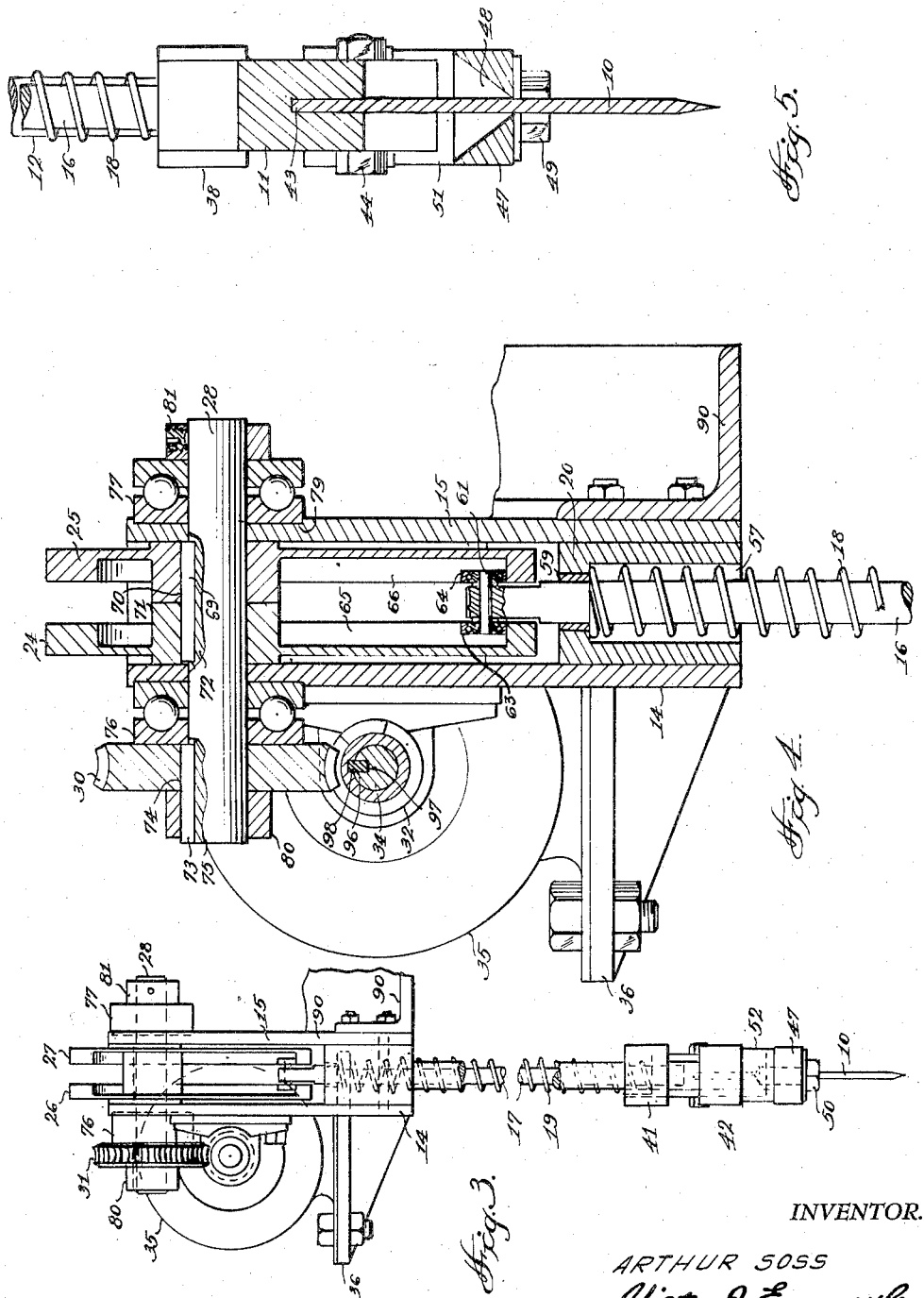

United States Patent Office 2,832,410
Patented Apr. 29, 1958

2,832,410

POWER ACTUATED MEAT CLEAVER

Arthur Soss, McCook, Nebr.

Application August 16, 1955, Serial No. 528,786

1 Claim. (Cl. 164—47)

This invention relates to a power actuated meat cleaver of the type having a horizontally disposed cutting blade positioned with the ends slidably mounted on parallel rods, and in particular, a frame having motor actuated hook like substantially semi-circular cams positioned to engage rollers on upper ends of spring actuated plungers on lower ends of which a cutting blade is carried; whereby with continued operation of the cams the rollers drop from ends thereof permitting the springs to drive the cutting blade through a carcass of beef or the like.

This invention is an improvement over the power actuated cleavers of my copending applications with the Serial Nos. 349,842 and 443,728, filed April 20, 1953 and July 15, 1954, which matured into U. S. Patents 2,718,697 and 2,718,698 respectively, on September 27, 1955, respectively, in that a cutting blade is drawn upwardly through a comparatively long stroke with cams and driven downwardly in the cutting stroke with springs whereby a relatively powerful snap action is obtained.

Various types of power or mechanically operated meat cleavers have been provided, however, with such devices, it is difficult to obtain sufficient power in a quick snap action stroke of a cutting blade to cut through meat having relatively small bones therein and where meat is dressed in quantities for chain and self service stores time is an essential feature and it is desired to provide a cutting blade that operates with a powerful snap action. With this thought in mind, this invention contemplates a supporting frame having spaced parallel rods depending therefrom with a cutting blade carrier slidably mounted on the rods and in which the carrier and blade are drawn upwardly by hook like cams actuated by a motor and snapped downwardly by springs whereby a quick snap action is obtained and the blade positively driven through a carcass or the like.

The object of this invention is, therefore, to provide a mechanically actuated cleaver blade in which the blade is withdrawn by motor driven cams and returned in the cutting stroke by springs.

Another object of the invention is to provide a power driven cutting knife in which the cutting blade may readily be removed and replaced.

Another important object of the invention is to provide a power actuated cleaver in which the cutting blade is mounted on a carrier slidably mounted on parallel rods and in which the carrier is mounted on the rods with spaced bearings reducing binding therein to a minimum.

A further object of the invention is to provide a cleaver having a power actuated cutting blade slidably mounted on parallel rods actuated in the cutting stroke by springs and retracted by cams in which the device is of a simple and economical construction.

With these and other objects and advantages in view, the invention embodies a mounting frame having a motor suspended therefrom, pairs of hook like substantially semi-circular cams rotatably mounted in the frame and operatively connected to the motor, spaced parallel rods depending from the frame, a carrier having spaced bearings at each end slidably mounted on the rods, a base plate connecting the lower ends of the rods, plungers having rollers on upper ends thereof positioned to be engaged by the hook like cams slidably mounted in the frame and extended into sockets of the carrier, springs positioned around the plungers and adapted to urge the carrier away from the frame, and means for mounting a cutting blade in the carrier.

Other features and advantages of the invention will appear from the following description, taken in connection with the drawings, wherein:

Figure 1 is a front elevational view of the improved power actuated cleaver with parts broken away and also with parts shown in section.

Figure 2 is a sectional plan taken on line 2—2 of Figure 1 illustrating the mounting of the cutting blade carrier on one of the sliding rods and also the means for securing the cutting blade in the carrier.

Figure 3 is an end elevational view showing the improved power actuated cleaver also with parts broken away.

Figure 4 is a vertical cross section taken on line 4—4 of Figure 1 illustrating the mounting and operating elements of one of the pairs of cams, the parts being shown on an enlarged scale.

Figure 5 is a cross section through the carrier and blade illustrating the mounting of the blade in the carrier, said section being taken on line 5—5 of Figure 1 and the parts also being shown on an enlarged scale.

Referring now to the drawings, wherein like reference characters denote corresponding parts, the improved power actuated cleaver of this invention includes a cutting blade 10, a carrier 11 slidably mounted on rods 12 and 13, a frame having side plates 14 and 15 between which the rods 12 and 13 are mounted, plungers 16 and 17 having springs 18 and 19, respectively, thereon slidably mounted in blocks 20 and 21 between the side plates of the frame and extending into sockets 22 and 23 in the carrier 11, pairs of cams 24 and 25 at one end and 26 and 27 at the other mounted on shafts 28 and 29 rotatably mounted in the side plates of the frame and having worm gears 30 and 31 thereon, worms 32 mounted on a shaft 34 and positioned to mesh with the gears 30 and 31, respectively, and a motor 35 carried by a bracket 36 extended from one end of the frame and the motor being operatively connected to one end of the shaft 34 with a coupling 37. The carrier 11 includes an elongated bar having spaced bearings 38 and 39 at one end with bearing sleeves 40 therein and 41 and 42 at the opposite end, the bearings 41 and 42 also having bearing sleeves 40 therein. The upper edge of the blade 10 extends into a slot 43 in the carrier 11 and the blade is secured in the slot with bolts 44 and 45, the ends of which are provided with nuts 46.

A base plate 47 having a slot 48 therein is secured on the lower ends of the rods 12 and 13 with cap screws 49 and 50 and the lower ends of the rods are provided with stops 51 and 52 of rubber or other suitable resilient material.

The lower ends of the plungers 16 and 17 are threaded in the sockets 22 and 23 of the carrier and, as shown in Figure 1, the lower ends of the plungers are secured in the sockets with pins 53 and 54. The plungers extend through counterbores 55 and 56 in which lower ends of the springs 18 and 19 are positioned and the upper ends of the springs extend into similar counterbores 57 and 58 in the spacing blocks 20 and 21, respectively, of the frame. The plungers extend through bearing sleeves 59 and 60 and, as illustrated in Figure 4, the upper ends of the plungers are provided with pins 61 and 62 on the ends of which ball bearings, providing rollers, are mounted. The ends of the pin 61 of the plunger 16 are provided with ball bearings 63 and 64 that are positioned to travel on inner surfaces 65 and 66 of the cams 24 and 25, respectively, and similar ball bearings 67 on the ends of the pin 62 of the plunger 17 are positioned to travel on inner surfaces 68 of the cams 26 and 27.

The cams 24, 25, 26 and 27 are mounted on the shafts with keys 69 which extend into slots 70 of hubs 71 of the cams and also into slots 72 of the shafts and the worm gears 30 and 31 are secured in position upon the shafts by similar keys 73 that extend into slots 74 of the gears and similar slots 75 of the shafts.

The shafts 28 and 29 are rotatably mounted on the side plates 14 and 15 with bearings 76 and 77, inner races of which are positioned in recesses 78 and 79 of the side plates and the outer races of which are secured in position by set collars 80 and 81, the collar 80 also retaining the worm gear 30 in position against the outer race of the bearing. The above noted description applies particularly to the shaft 28 and, as shown in the drawings, the shaft 29 is similarly mounted in the frame.

The side plates and spacing blocks are retained in assembled relation with bolts 82 and the motor bracket 36, to which the base 83 of the motor is secured by bolts 84 and nuts 85, is also secured between the side plates with bolts 86, similar to the bolts 82.

The shaft 34 is rotatably mounted in bearings 87 and 88 which are secured to the side plate 14 with bolts 89.

The frame is adapted to be mounted on a bracket including a horizontally disposed member 90 and a vertically disposed arm 91 and the frame is adapted to be secured to the elements of the bracket or supporting members with bolts, such as the bolts 92.

The shaft 34 is retained in position longitudinally with set collars 93, 94 and 95 and the worm gears 32 and 33 are secured in position on the shaft with keys 96 positioned in slots 97 in the shaft and 98 in the worm gears.

The cleaver is collapsible in that the rods 12 and 13 and plungers 16 and 17 with the springs 18 and 19 may readily be removed from the frame and the parts are readily assembled for use by inserting the plungers and springs in the sockets 57 and 58 with the plungers extended through the sleeve 60 and with the ends of the rods 12 and 13 inserted in sockets 99 and 100 in which the rods are secured by pins 101 and 102, respectively. The device may, therefore, be positioned in relatively small containers or cartons for storing and shipping and is adapted to be set up for use by the average layman.

With the cams patterned as illustrated in Figure 1 and rotated in a counterclockwise direction, the long ends of the cams pick up the roller bearings on the upper ends of the plungers and with continued rotation thereof the plungers, carrier and blade are retracted as the cams pass through 180 degrees, at which time the rollers drop from the short ends of the cams with the springs 18 and 19 driving the carrier and blade downwardly chopping through a carcass or the like.

It will be understood that modifications, within the scope of the appended claim, may be made in the design and arrangement of the parts without departing from the spirit of the invention.

What is claimed is:

A power cleaver comprising a carrier having a slot therein, bearings on the ends of said carrier, a cutting blade having its upper edge positioned in said slot, securing elements connecting said blade to said carrier, a frame embodying side plates, rods mounted between said side plates and engaging said bearings, resilient stop members arranged adjacent the lower ends of said rods, a base plate having a slot therein, cap screws securing the base plate to the lower ends of said rods, said carrier being slidably connected to said rods, blocks mounted between said side plates, plungers slidably mounted in said blocks, coil springs mounted on said plungers, there being sockets in said carrier for receiving said plungers, shafts supported by said side plates, a pair of cams mounted on each shaft, worm gears connected to said shafts, worms meshing with said worm gears, pins on the upper ends of said plungers, ball bearings on the ends of said pins, said cams having inner surfaces for receiving said ball bearings, a motor arranged adjacent one end of said frame for operating said worms, and a bracket extending from one end of the frame for supporting said motor.

References Cited in the file of this patent

UNITED STATES PATENTS

| | | |
|---|---|---|
| 308,119 | White | Nov. 18, 1884 |
| 861,267 | Cooper | July 30, 1907 |
| 1,662,596 | Abbott | Mar. 13, 1928 |
| 2,582,694 | Gundlach | Jan. 15, 1952 |
| 2,718,698 | Soss | Sept. 27, 1955 |

FOREIGN PATENTS

| | | |
|---|---|---|
| 360,094 | Great Britain | Nov. 5, 1931 |